April 5, 1938.                 J. C. BARNES                    2,113,072
                         DIRECT READING HYGROMETER
                           Filed Sept. 16, 1936
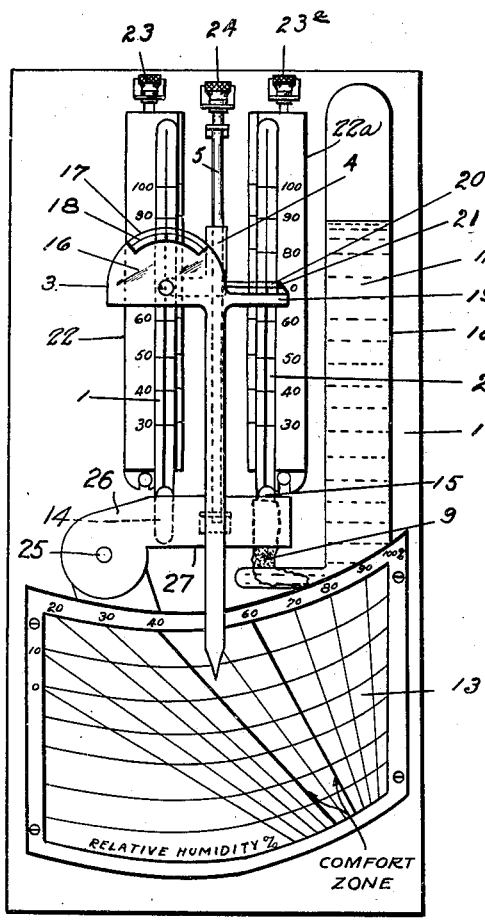
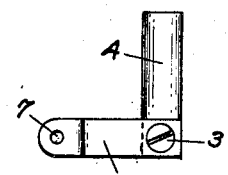
Fig. 3.
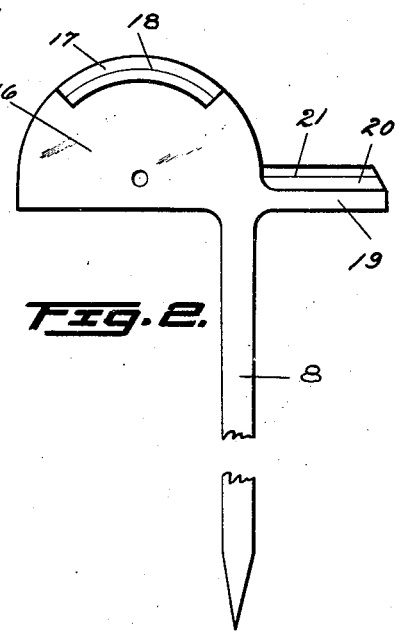
Fig. 2.
Fig. 1.
INVENTOR
James Cartwright Barnes
BY
ATTORNEY Patented Apr. 5, 1938

2,113,072

UNITED STATES PATENT OFFICE 2,113,072

DIRECT READING HYGROMETER

James Cartwright Barnes, Toronto, Ontario, Canada

Application September 16, 1936, Serial No. 100,992
In Canada September 19, 1935

3 Claims. (Cl. 73—338)

My invention relates to what is commonly known as "wet" and "dry" bulb hygrometer and is particularly directed towards providing an instrument by means of which it is possible to read directly the percent relative humidity of the atmosphere without the necessity of referring to separate graphs or tables.

The most common of the "wet" and "dry" bulb hygrometers comprises two thermometers, similarly calibrated, fixed side by side on a common base line. The bulb of the "dry bulb" thermometer is exposed to the atmosphere while the bulb of the "wet bulb" thermometer is enclosed in the upper end of a piece of absorbent cloth, such as lamp wick, the lower end of the cloth being immersed in a vessel of water maintained at substantially atmospheric temperature. Water is absorbed by the absorbent cloth with the result that the cloth enclosing the bulb of that thermometer is kept saturated. At the same time water is continually evaporating from the absorbent cloth with a corresponding absorption of heat so that the water evaporated from the cloth enclosing the bulb of the "wet bulb" thermometer maintains that bulb cooler than atmospheric temperature thus causing a difference in the temperature reading between the two thermometers. It will be apparent that the rate of evaporation is dependent on the relative humidity of the atmosphere which is indicated by a greater or lesser difference in the temperature reading of the two thermometers. This difference in the temperature reading is transferable into percent relative humidity by the use of extraneous graphs or tables supplied with the instrument.

One of the principal features of my invention is that I have devised an instrument and associated parts whereby it is possible to indicate, and read therefrom, the percent relative humidity of the atmosphere directly from the instrument without the necessity of referring to any extraneous parts such as graphs or tables which require calculations often beyond the understanding of those attempting to use the instrument.

A further feature of my invention lies in the fact that my instrument may be operated either manually or mechanically in conjunction with air conditioning apparatus whereby the percent relative humidity of a room or building is at all times positively and immediately controllable.

Other novel and important features of my invention will be apparent from the following description and accompanying drawing in which:—

Fig. 1 is a front view of my invention with the associated parts necessary for the operation of the instrument.

Fig. 2 is a front view of the indicator arm.

Fig. 3 is a front view of the L-shaped member.

The instrument illustrated in the drawing comprises a panel 12 on which are mounted two similarly calibrated thermometers 1 and 2. It is essential from the viewpoint of accuracy that they are calibrated as similarly as possible and located on a common base line in such a manner that each calibration mark of the scales is directly opposite the corresponding calibration mark of the other thermometer. In this respect I prefer to mount each thermometer on a movable base in such a manner that each thermometer may be separately movable in an upward or downward direction as shall hereinafter be explained. As a further feature, also from the viewpoint of accuracy, it is desirable that the thermometers should be of the "non-magnifying stem" type.

The bulb 14 of the thermometer 1 is exposed to the atmosphere while the bulb 15 of the thermometer 2 is enclosed in the upper end of the absorbent cloth 9, the lower end of which is immersed in the water 11 confined in the vessel 10.

The arm 4 of the L-shaped member 3, and forming a part thereof is movably mounted on the rod 5 while the arm 6 extends over the "dry bulb" thermometer 1 in such a manner that the small orifice 7 bored in said arm 6 is directly over and approximate to the stem of the thermometer 1.

The orifice 7 provided in the L-shaped member 3 forms the pivotal mounting point for the indicator arm 8. The lower end of the indicator arm 8 terminates in a point directly over the graph 13, the construction of which shall be explained hereinafter. The upper semi-circular portion 16 of the indicator arm 8 extends over the stem of the "dry bulb" thermometer 1 and is provided on the circumference with a transparent celluloid portion 17. The celluloid portion 17 is further provided with a hair line 18 the radius of which is dependent on the position of the 100% line on graph 13 and therefore may be varied accordingly. It is necessary, however, that the orifice 7 is on the centre line of the hair line 18. The upper portion of extension 19 of the indicator arm 8 extends over the stem of the "wet bulb" thermometer 2 and is provided with a transparent celluloid portion 20. The hair line 21, which is also provided in the celluloid portion 20, is also on the centre line of the orifice 7.

In order to minimize the cost of instruments for ordinary commercial use the L-shaped member 3 may be mounted on the rod 5 by any of the known methods in order that it may slide freely upwardly or downwardly and at the same time held firmly when the desired position is reached. I prefer to use a friction spring (not shown) for this purpose. For more costly instruments, however, where accuracy is the predominant factor, I prefer to provide means for a very fine adjustment of the extension 19 such as by means of the thumb-screw 24.

The water vessel 10 may be of any preferred shape and secured to the panel 12 in any desired manner.

The graph 13, by means of which, in conjunction with the indicator 8, it is possible to read directly the percent relative humidity of the atmosphere, is devised in the following manner:—

The hair lines 18 and 21 are placed to contact for example the 90° calibration mark of their respective scales. When the indicator 8 is in this position, of course, it will be apparent that there can be no evaporation, therefore the indicator establishes a point on the 100% curve. It should be apparent that the curve denoting the 100% relative humidity will be a straight line passing through the point so established. The indicator arm 8 is now deflected to the left 1° by rotation on the pivotal point 7, thus establishing a second point which is also marked. The indicator arm 8 is again deflected to the left one degree at a time, or progressively increasing difference of 1° until it has covered the complete range. The pivot point 7 is then moved downwardly 10° and the hair lines 18 and 21 adjusted to contact the 80° calibration mark on their respective scales. The indicator 8 is again deflected to the left one degree at a time until it has again covered the desired range, thus establishing a third point on each curve. This operation is repeated until all the points are established on each curve. These points, on each curve, are then connected forming the curves as illustrated in Fig. 1.

In operation there will be a continual difference in temperature between the two thermometer scales dependent on the rate of the evaporation of the water from the cloth enclosing the bulb 15 of the "wet bulb" thermometer 2. The rate of evaporation varies inversely as the relative humidity of the atmosphere, i. e. the higher the humidity the slower will be the rate of evaporation. The indicator arm 8 is so placed that the hair line 18 contacts the calibration mark denoting the temperature reading of thermometer 1. The indicator 8 is deflected to the left by pivoting on the point 7 until the hair line 21 contacts the calibration mark denoting the temperature reading of thermometer 2. The indicator 8 then indicates on the graph 13 the percent relative humidity of the atmosphere.

It will be apparent that occasionally during the operating life of my instrument one or other of the thermometers 1 and 2 may be inadvertently broken. In such a case it may be very difficult to replace the broken thermometer with one whose calibration marks are directly in line with the calibration marks of the other thermometer without going to the expense of providing very costly precision thermometers.

In originally constructing the device, therefore, I mark the panel 12 approximate to each of the thermometer stems with one or more calibration marks, preferably every 10 degrees corresponding to the scale for which the graph is constructed.

I further mount each of the thermometers on movable bases 22 and 22a in such a manner that each of the thermometer stems may be moved individually upwardly or downwardly by rotation of the thumb screws 23 and 23a. In this manner it is possible to use any pair of thermometers whose scales are approximate to the graph scale.

I have found my instrument to be particularly adapted for use in conjunction with air conditioning equipment whereby it is possible to maintain the percent relative humidity of the atmosphere within a room or building most suitable to the occupants or to the type of manufacture being carried on and, at the same time, effect the most economical operation of the air conditioning apparatus. I have illustrated in the drawing a "comfort zone" which is readily adaptable to meet desired conditions, either for particular types of manufacture or the occupants, and by means of which anyone operating the instrument can readily determine whether or not the percent relative humidity is within the desired range. In this respect for the ordinary domestic air conditioning installations it may be necessary to show on the graph only this "comfort zone" as the average householder will not be interested in the percent relative humidity outside that zone.

As a further feature for the more accurate determination of the percent relative humidity I provide a blower 25 mounted in a housing 26—27 for circulating air at room temperature in contact with the thermometer bulbs 14 and 15. I have found that embodying this feature greatly increases the accuracy of my instrument while the increased cost is negligible. The blower may be operated, such as by clockwork for a minute or so prior to taking the reading thereby ensuring that each thermometer indicates the actual room temperature which I have found to be as much as several degrees different from that indicated prior to operating the blower.

Having thus fully described my invention what I claim as new and desire to secure by Letters Patent is:

1. A direct reading hygrometer which comprises a "dry" bulb thermometer and a "wet" bulb thermometer, a cross member mounted between said thermometers on a vertically adjustable pivot supporting member, said cross member being a unitary rigid structure having two arms for co-operation with the two thermometer columns and an angularly disposed pointer adjustable, upon corresponding adjustments of said arms, over a chart calibrated in percent relative humidity, the "dry" bulb thermometer arm of said cross member having an elevated arcuate portion relative to said pivot point for registration with its thermometer and the "wet" bulb thermometer arm extending on a line with said pivot point, the extent of the movement of said pointer across said chart being relative to the difference in the temperature readings of the two thermometers.

2. A direct reading hygrometer which comprises a "dry" bulb thermometer and a "wet" bulb thermometer, a cross member mounted between said thermometers on a vertically adjustable pivot supporting member, said cross member being a unitary rigid structure having two arms for co-operation with and overlying the two thermometer columns and an angularly disposed pointer adjustable, upon corresponding adjustments of said arms, over a chart calibrated in percent relative humidity, the "dry" bulb thermometer arm of said cross member having an elevated arcuate portion relative to said pivot point for registration with its thermometer and the "wet" bulb thermometer arm extending on a line with said pivot point, the extent of the movement of said pointer across said chart being relative to the difference in the temperature readings of the two thermometers.

3. A direct reading hygrometer which comprises a "dry" bulb and a "wet" bulb thermometer, a cross member mounted between said thermometers on a vertically adjustable pivot supporting member, said cross member being a unitary rigid structure having two arms for co-operation with and overlying the two thermometer columns and an angularly disposed pointer adjustable, upon corresponding adjustments of said arms, over a chart calibrated in percent relative humidity, the "dry" bulb thermometer arm of said cross member having an elevated arcuate portion relative to said pivot point for registration with its thermometer, the "wet" bulb thermometer arm extending on a line with said pivot point and each arm being provided with a window and hair lines to facilitate registering adjustment, the extent of the movement of said pointer across said chart being relative to the difference in the temperature readings of the two thermometers.

JAMES CARTWRIGHT BARNES.